US008381295B2

(12) United States Patent
Stolfo et al.

(10) Patent No.: US 8,381,295 B2
(45) Date of Patent: Feb. 19, 2013

(54) SYSTEMS AND METHODS FOR CORRELATING AND DISTRIBUTING INTRUSION ALERT INFORMATION AMONG COLLABORATING COMPUTER SYSTEMS

(75) Inventors: Salvatore J Stolfo, Ridgewood, NJ (US); Tal Malkin, New York, NY (US); Angelos D Keromytis, New York, NY (US); Vishal Misra, New York, NY (US); Michael Locasto, Springfield, VA (US); Janak Parekh, Manhasset, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 12/833,743

(22) Filed: Jul. 9, 2010

(65) Prior Publication Data

US 2010/0281541 A1    Nov. 4, 2010

Related U.S. Application Data

(63) Continuation of application No. 10/864,226, filed on Jun. 9, 2004, now Pat. No. 7,779,463.

(60) Provisional application No. 60/570,349, filed on May 11, 2004.

(51) Int. Cl.
    *H04L 29/06* (2006.01)
(52) U.S. Cl. .............................. 726/23; 380/59; 709/224
(58) Field of Classification Search ..................... 726/23
    See application file for complete search history.

(56) References Cited

U.S. PATENT DOCUMENTS

| | | | |
|---|---|---|---|
| 5,621,889 | A | 4/1997 | Lermuzeuaux et al. |
| 5,812,763 | A | 9/1998 | Teng |
| 5,919,257 | A | 7/1999 | Trostle |
| 5,919,258 | A | 7/1999 | Kayashima et al. |
| 6,016,553 | A | 1/2000 | Schneider et al. |
| 6,279,113 | B1 | 8/2001 | Vaidya |
| 6,460,055 | B1 | 10/2002 | Midgley et al. |
| 6,802,025 | B1 | 10/2004 | Thomas et al. |
| 6,804,667 | B1 | 10/2004 | Martin |
| 6,957,348 | B1 | 10/2005 | Flowers et al. |
| 7,146,421 | B2 | 12/2006 | Syvanne |
| 7,386,733 | B2* | 6/2008 | Yoon et al. .................... 713/189 |
| 7,406,713 | B2* | 7/2008 | Sheymov et al. ............... 726/23 |
| 7,913,303 | B1 | 3/2011 | Rouland et al. |
| 2002/0023227 | A1* | 2/2002 | Sheymov et al. ............. 713/201 |
| 2002/0059078 | A1* | 5/2002 | Valdes et al. ....................... 705/1 |
| 2002/0133594 | A1 | 9/2002 | Syvanne |

(Continued)

FOREIGN PATENT DOCUMENTS

WO    WO/03/029934    4/2003

OTHER PUBLICATIONS

"A Common Intrusion Detection Framework," Kahn et al., Jul. 15, 1998.*

(Continued)

*Primary Examiner* — Oscar Louie
(74) *Attorney, Agent, or Firm* — Byrne Poh LLP

(57) ABSTRACT

Systems and methods for correlating and distributing intrusion alert information among collaborating computer systems are provided. These systems and methods provide an alert correlator and an alert distributor that enable early signs of an attack to be detected and rapidly disseminated to collaborating systems. The alert correlator utilizes data structures to correlate alert detections and provide a mechanism through which threat information can be revealed to other collaborating systems. The alert distributor uses an efficient technique to group collaborating systems and then pass data between certain members of those groups according to a schedule. In this way data can be routinely distributed without generating excess traffic loads.

67 Claims, 12 Drawing Sheets

U.S. PATENT DOCUMENTS

| | | | |
|---|---|---|---|
| 2003/0167404 A1 | 9/2003 | Han et al. | |
| 2003/0172282 A1 | 9/2003 | Jiang | |
| 2004/0088583 A1* | 5/2004 | Yoon et al. | 713/201 |
| 2004/0199579 A1* | 10/2004 | Straw | 709/204 |
| 2005/0044406 A1* | 2/2005 | Stute | 713/201 |

OTHER PUBLICATIONS

"ForNet: A Distributed Forensics Network," Shanmugasundaram et al., Department of Computer and Information Science Polytechnic University, Brooklyn, NY 11201, USA, 2003.*

"EMERALD: Event Monitoring Enabling Responses to Anomalous Live Disturbances," Porras et al., 1997 National Information Systems Security Conference, Oct. 1997.*

"An Architecture for Intrusion Detection using Autonomous Agents," Balasubramaniyan et al., COAST Laboratory Purdue University, 1998.*

"Cooperating Security Managers: A Peer-Based Intrusion Detection System," White et al., IEEE Network, 1996.*

"A framework for cooperative intrusion detection," Frincke et al., In Proc. 21st NIST-NCSC National Information Systems Security Conference, 1998.*

"Decentralized Event Correlation for Intrusion Detection," Krugel et al., Information Security and Cryptology—ICISC 2001, Lecture Notes in Computer Science, 2002, vol. 2288/2002, 59-95, DOI: 10.1007/3-540-45861-1__10, 2002.*

"Alert Correlation in a Cooperative Intrusion Detection Framework," Cuppens et al., Security and Privacy, 2002. Proceedings. 2002 IEEE Symposium on, Aug. 30, 2004.*

"Collaborative intrusion detection system (CIDS): a framework for accurate and efficient IDS," Wu et al., Computer Security Applications Conference, 2003. Proceedings. 19th Annual, 2003.*

"A cooperative intrusion detection system for ad hoc networks," Huang et al., Georgia Institute of Technology, SASN '03 Proceedings of the 1st ACM workshop on Security of ad hoc and sensor networks, 2003.*

"Protecting routing infrastructures from denial of service using cooperative intrusion detection," Cheung et al., Department of Computer Science, University of California, Davis, CA, NSPW '97 Proceedings of the 1997 workshop on New security paradigms, 1997.*

"Deep Packet Inspection Using Parallel Bloom Filters," Dharmapurikar et al., IEEE vol. 24 Issue 1, Jan.-Feb. 2004.

"Harsh-based IP traceback," Snoeren, Applications, Technologies, Architectures, and Protocols for Computer Communication Proceedings of the 2001 conferenc on Applications, technologies, architectures, and protocols for computer communications, pp. 3-14, ACM New York, NY, USA, 2001.

"Network Applications of Bloom Filters: A Survey," Mitzenmacher et al., In Proceedings of the 40th Annual Allerton Conference on Communications, Control, and Computing, 2002.

"On Real-Time Intrusion Detection and Source Identification," Chang, Graduate Faculty of North Carolina State University, Electrical Engineering, Raleigh, 2000.

"Querying the internet with PIER," Huebsch et al., Very Large Data Bases Proceedings of the 29th international conference on Very large data bases—vol. 29, pp. 321-332, 2003.

A. C. Yao. Theory and application of trapdoor functions. In Proc. of the 29th Annu. IEEE Symp. on Foundations of Computer Science, pp. SD-91, 1982.

Abdelsayed et al., "An efficient filter for denial-of-service bandwith attacks," Global Telecommunications Conference, 2003. Globecom '03, IEEE, vol. 3, on pp. 1353-1357 vol. 3, Dec. 1-5, 2003.

Burton H. Bloom, "Space/time trade-offs in hash coding with allowable errors", Communications of the ACM, v.13 n.7, p. 422-426, Jul. 1970.

Chun et al., "Netbait: a Distributed Worm Detection Service," Intel Corporation, Intel Research Berkeley, Sep. 2003.

Colleen Shannon and David Moore. The Spread of the Witty Worm. Technical report, Mar. 2004.

D. Chaum, C. Crepeau, and I. Damgard. Multiparty unconditionally secure protocols. In Proc. 01 the 20th Annu. ACM Symp. on the Theory 01 Computing, pp. 11-19, 1988.

Dain, O. and Cunningham, R. K., "Fusing a Heterogeneous Alert Stream Into Scenarios," 2001, Massachusetts Institute of Technology.

Huang, M. Y. and Wicks, T. M., "A Large-Scale Distributed Intrusion Detection Framework Based on Attack Strategy Analysis," 1998, Applied Research and Technology, The Boeing Company.

K. Wang and S. J. Stolfo. "Anomalous Payload-Based Network Intrusion Detection," In Proceedings of the 7th International Symposium on Recent Advances in Intrusion Detection (RAID), pp. 203-222, Sep. 2004.

King, S. T. and Chen, P. M., "Backtracking Intrusions," 2004, University of Michigan, Department of Electrical Engineering and Computer Science.

Kodialam, M. and Lakshman, T. V., "Detecting Network Intrusions via Sampling: A Game Theoretic Approach," 2003, Bell Laboratories, Lucent Technologies.

Lambert Schaelicke, Matthew R. Geiger, and Curt J. Freeland. Improving the Database Logging Performance of the Snort Network Intrusion Detection Sensor. Technical Report Technical Report 03-10, 2002.

Lincoln, P. et al., 2004, "Privacy-Preserving Sharing and Correlation of Security Alerts," SRI International.

Locasto et al., "Collaborative Distrubuted Intrusion Detection," Columbia University 2004.

M. Ben-Or, S. Goldwasser, A. Wigderson. Completeness theorems for noncryptographic fault-tolerant distributed computations. In Proc. of the 20th Annu. A CM Symp. on the Theory of Computing, pp. 1-10, 1988.

M. Roesch. "Snort: Lightweight Intrusion Detection for Networks." In Proceedings of USENIX LISA, Nov. 1999. (Software available from http://www.snort.org/).

Moore, D., et al. Internet Quarantine: Requirements for Containing Self-Propagating Code. in INFOCOM. 2003.

Ning, P. et al., "Constructing Attack Scenarios Through Correlation of Intrusion Alerts," 2002, NC State University Department of Computer Science.

Office Action dated Jan. 11, 2008 in U.S. Appl. No. 10/996,574.

Office Action dated Feb. 7, 2011 in Canadian Application No. 2470454.

Office Action dated May 13, 2009 in U.S. Appl. No. 10/864,226.

Office Action dated Jun. 24, 2009 in U.S. Appl. No. 10/996,574.

Office Action dated Aug. 27, 2008 in U.S. Appl. No. 10/864,226.

Office Action dated Oct. 6, 2008 in U.S. Appl. No. 10/996,574.

Office Action dated Oct. 20, 2011 in U.S. Appl. No. 12/837,302.

Office Action dated Dec. 10, 2007 in U.S. Appl. No. 10/864,226.

Qin, X. and Wenke, L., 2003, "Statistical Causality Analysis of INFOSEC Alert Data", College of Computing Georgia Institute of Technology.

Robertson, S. et al., "Surveillance Detection in High Bandwidth Environments," 2003.

S. Stolfo. "Worm and Attack Early Warning: Piercing Stealthy Reconnaissance." IEEE Privacy and Security, May/Jun. 2004.

Snoeren et al., "Single-Packet IP Traceback," IEEE/ACM Transactions on Networking (TON), pp. 721-734, vol. 10, Issue 6 (Dec. 2002).

Stoica, I. et al., "Chord: A Scalable Peer-to-Peer Lookup Service for Internet Application," Proceedings of ACM SIGCOMM, Aug. 2001.

U.S. Appl. No. 10/996,574, filed Nov. 24, 2004.

U.S. Appl. No. 12/837,302, filed Jul. 15, 2010.

V. Yegneswaran, P. Barford, and S. Jha. "Global Intrusion Detection in the DOMINO Overlay System." In Proceedings of the ISOC Symposium on Network and Distributed System Security (SNDSS), Feb. 2004.

Wenliang Du and Mikhail J. Atallah. Secure multi-party computation problems and their applications: A review and open problems. In Proceedings New Security Paradigms Workshop (NSPW), Cloudcroft, NM, 2001.

Yang, J. et al., "Cards: A Distributed System for Detecting Coordinated Attacks," 2000, George Mason University, Center for Secure Information Systems.

Costa, M., et al., "Can We Contain Internet Worms?", In Third Workshop on Hot Topics in Networks (HotNets-III), San Diego, CA, USA, Nov. 15-16, 2004.

Cuppens, F. And Ortalo, R., "LAMBDA: A Language to Model a Database for Detection of Attacks", In Proceedings of the Third International Workshop on Recent Advances in Intrusion Detection (Raid '00), Toulouse, FR, Oct. 2-4, 2000, pp. 197-216.

Goldreich, O., et al., "How to Play Any Mental Game", In Proceedings of the Nineteenth Annual ACM Symposium on Theory of Computing (STOC '87 ), 1987, pp. 218-229.

Stolfo, S.J., et al., "Worm and Attack Early Warning: Piercing Stealthy Reconnaissance", In IEEE Security and Privacy, vol. 3, No. 3, May/Jun. 2004, pp. 73-75.

System Detection, Inc., "System Detection Delivers Antura Vision", Business Wire, Sep. 8, 2003.

Wise, M., "Windows XP System Restore", Microsoft TechNet, Windows & NET Magazine, Dec. 4, 2002, available at: http://www.windowsitpro.com/magazine/.

Office Action dated Jul. 12, 2012 in U.S. Appl. No. 12/837302.

Office Action dated Mar. 1, 2012 in Canadian Application No. 2470454, filed Jun. 9, 2004.

* cited by examiner

FIG. 6

| B.F # | DESCRIPTION | INPUT |
|---|---|---|
| 1 | ALL C.S. | SOURCE IP ADDR |
| 2 | BANK C.S. | SOURCE IP ADDR |
| 3 | GOV'T C.S. | SIGNATURE |
| 4 | INTERNAL ATTACKS | SIGNATURE |
| 5 | EXTERNAL ATTACKS | SOURCE IP ADDR |
| 6 | PORT 80 | SOURCE IP ADDR |
| 7 | SCAN ALERTS | SOURCE IP ADDR |
| 8 | NON-SCAN ALERTS | SOURCE IP ADDR |
| 9 | LOGIN ATTACKS | SOURCE IP ADDR |
| 10 | TODAY'S ATTACKS | SOURCE IP ADDR |
| 11 | YESTERDAY'S ATTACKS | SOURCE IP ADDR |
| ⋮ | ⋮ | ⋮ |
| n | | |

SYSTEMS AND METHODS FOR CORRELATING AND DISTRIBUTING INTRUSION ALERT INFORMATION AMONG COLLABORATING COMPUTER SYSTEMS

CROSS REFERENCE TO RELATED APPLICATION

This application is a continuation under 35 U.S.C. §120 of U.S. patent application Ser. No. 10/864,226, filed Jun. 9, 2004, which claims the benefit under 35 U.S.C. §119(e) of U.S. Provisional Patent Application No. 60/570,349, filed May 11, 2004, both of which are hereby incorporated by reference herein in its their entireties.

BACKGROUND

The present invention relates to computer network security. More particularly, the present invention relates to systems and methods for correlating and distributing intrusion alert information among collaborating computer systems.

Computer viruses, worms, trojans, hackers, malicious executables, network application errors, misuse of computer systems, scans, probes, etc. (collectively hereinafter "threats") are constant menace to all owners, operators, and users of computers connected to public computer networks (such as the Internet) and/or private networks (such as corporate computer networks). These owners, operators, and users (collectively hereinafter "users") include universities, businesses, governments, non-profit organizations, individuals, families, etc. (collectively hereinafter "entities"). These threats are not just an inconvenience to these owners, operators, and users, but also a major economic drain. For example, it has been reported that computer threats caused $13 billion worth of economic losses in the year 2003.

Although many computers are protected by firewalls and antivirus software, these preventative measures are not always adequate. For example, a recently launched worm took advantage of a known vulnerability in a popular firewall technology the day after the public became aware of the vulnerability. Because of the rapid launch of the worm, the patch necessary to correct the vulnerability could not be deployed in time to prevent the attack. Similarly, most antivirus software relies on updates to that software so that signatures of known viruses can be utilized to recognize threats. In the case of a "zero-day" threat (e.g., a threat that has just been launched), most computer systems are completely vulnerable because no known patch or signature update has yet been made available.

Like many non-computer attacks, computer attacks are usually preceded by reconnaissance activity. For example, prior to launching a worm, it may be useful for the nefarious computer user or hacker to identify computers, particular ports, and their associated services subject to a target vulnerability. Because a scan is more likely to go unnoticed, or be ignored, than an attack, the hacker is able to identify a large number of potential targets without detection. Then, when an adequate number of targets have been identified, the hacker can launch the worm against all of the identified targets simultaneously rather than attacking the targets as they are found during scanning. In this way, the hacker can cause greater damage because the distribution of the worm at first detection is likely to be widespread. When performing this reconnaissance, the hacker may scan or probe potential victims at a slow or random rate to avoid detection by the victim. In order to maximize the likelihood of quickly finding targets, the hacker may configure the scanning and probing to scan unrelated potential victims at substantially the same time, but scan related targets only infrequently.

Collaborative security systems wherein multiple systems cooperate to defend against threats may be useful in mitigating some of the exposure caused by random and infrequent scanning and probing. A problem with prior attempts at collaborative security systems, however, is that many entities are unwilling to share information regarding the identity of parties accessing their systems because of legal, public-relations, and competitive reasons. For example, a corporation may be reluctant to reveal the IP address of a suspected hacker to other corporations for fear that the suspected hacker is not in fact a hacker, but instead a valued customer.

Accordingly, it is desirable to provide new systems and methods for collaboratively detecting and defending against scans, probes, viruses, and other threats in a computer network environments.

SUMMARY OF THE INVENTION

In accordance with the present invention, systems and methods for correlating and distributing intrusion alert information among collaborating computer systems are provided. These systems and methods provide an alert correlator and an alert distributor that enable early signs of a threat to be detected and rapidly disseminated among collaborating systems. The alert correlator stores information related to a threat, correlates alert detections, and provides a mechanism through which threat information can be revealed to other collaborating systems. For example, in accordance with the present invention, a one-way data structure such as a bloom filter may be used to store information related to a threat and for correlating detected alerts. Because one-way data structures such as bloom filters can be written to with data and checked to determine whether specifically known data has been previously written, but cannot be read to reveal what data has been written, these structures can be provided to other collaborating systems without revealing the information contained therein. Other types of data structures that do reveal such information may also be used when appropriate. When alerts are correlated, the alert correlator may indicate a threat. Any suitable response to the threat may then be taken, and information about the threat may be provided to other collaborating systems. This information may include a "profile" of the attack that enables the recipient of the information to infer the intent of the attacker and respond accordingly.

The alert distributor uses an efficient technique to group collaborating systems and then pass data between certain members of those groups according to a schedule. In this way data can be routinely distributed without generating excess traffic loads. For example, the alert distributor may be used to exchange one-way data structures (e.g., bloom filters) or non-one-way data structure between collaborating systems. When such structures are received, the structures may be compared to determine whether there is a correlation of alert information between data structures. If there is, a threat may be indicated and any suitable action taken. For example, other collaborating systems may be alerted to the presence of the threat.

In one embodiment, the invention provides a method for detecting a threat to a computer, comprising: detecting a first intrusion attempt; storing information related to the first intrusion attempt in a one-way data structure; detecting a second intrusion attempt; checking the one-way data structure to determine whether stored information related to the first intrusion attempt correlates with the second intrusion attempt; and indicating that a threat is present when the stored information related to the first intrusion attempt correlates with the second intrusion attempt.

In a second embodiment, the invention provides a method for detecting a threat to a computer, comprising: receiving a one-way data structure from a collaborating system that contains information related to a first intrusion attempt; detecting a second intrusion attempt; checking the one-way data structure to determine whether stored information related to the first intrusion attempt correlates with the second intrusion attempt; and indicating that a threat is present when the stored information related to the first intrusion attempt correlates with the second intrusion attempt.

In a third embodiment, the invention provides a method for detecting a threat to a computer, comprising: receiving a data structure from a collaborating system that contains information related to a first intrusion attempt; receiving an indication of a characteristic of the collaborating system; detecting a second intrusion attempt; checking the data structure to determine whether stored information related to the first intrusion attempt correlates with the second intrusion attempt; and, based on the characteristic of the collaborating system, indicating that a threat is present when the stored information related to the first intrusion attempt correlates with the second intrusion attempt.

In a fourth embodiment, the invention provides a system for detecting intrusion attempts, comprising: an intrusion detection system that detects a first intrusion attempt and a second intrusion attempt; and an alert correlator that receives information related to the first intrusion attempt, that stores the information in a one-way data structure, that checks the one-way data structure to determine whether stored information related to the first intrusion attempt correlates with the second intrusion attempt, and that indicates that a threat is present when the stored information related to the first intrusion attempt correlates with the second intrusion attempt.

In a fifth embodiment, the invention provides a system for detecting intrusion attempts, comprising: an alert distributor that receives a one-way data structure from a collaborating system, wherein the one-way data structure contains stored information relating to a first intrusion attempt; an intrusion detection system that detects a second intrusion attempt; and an alert correlator that receives information related to the second intrusion attempt, that checks the one-way data structure to determine whether the stored information related to the first intrusion attempt correlates with the second intrusion attempt, and that indicates that a threat is present when the stored information related to the first intrusion attempt correlates with the second intrusion attempt.

In a sixth embodiment, the invention provides a system for detecting intrusion attempts, comprising: an alert distributor that receives a data structure from a collaborating system, wherein the data structure contains stored information relating to a first intrusion attempt, and that receives an indication of a characteristic of the collaborating system; an intrusion detection system that detects a second intrusion attempt; and an alert correlator that receives information related to the second intrusion attempt, that checks the data structure to determine whether the stored information related to the first intrusion attempt correlates with the second intrusion attempt, and that, based on the characteristic of the collaborating system, indicates that a threat is present when the stored information related to the first intrusion attempt correlates with the second intrusion attempt.

BRIEF DESCRIPTION OF THE DRAWINGS

The present invention is now illustrated in connection with the accompanying drawings in which like references refer to like parts throughout and in which:

FIG. 6 is an illustration of a table showing an example of different types of bloom filters and corresponding inputs that may be used in accordance with certain embodiments of the present invention;

DETAILED DESCRIPTION OF THE PREFERRED EMBODIMENTS

Figure 1:
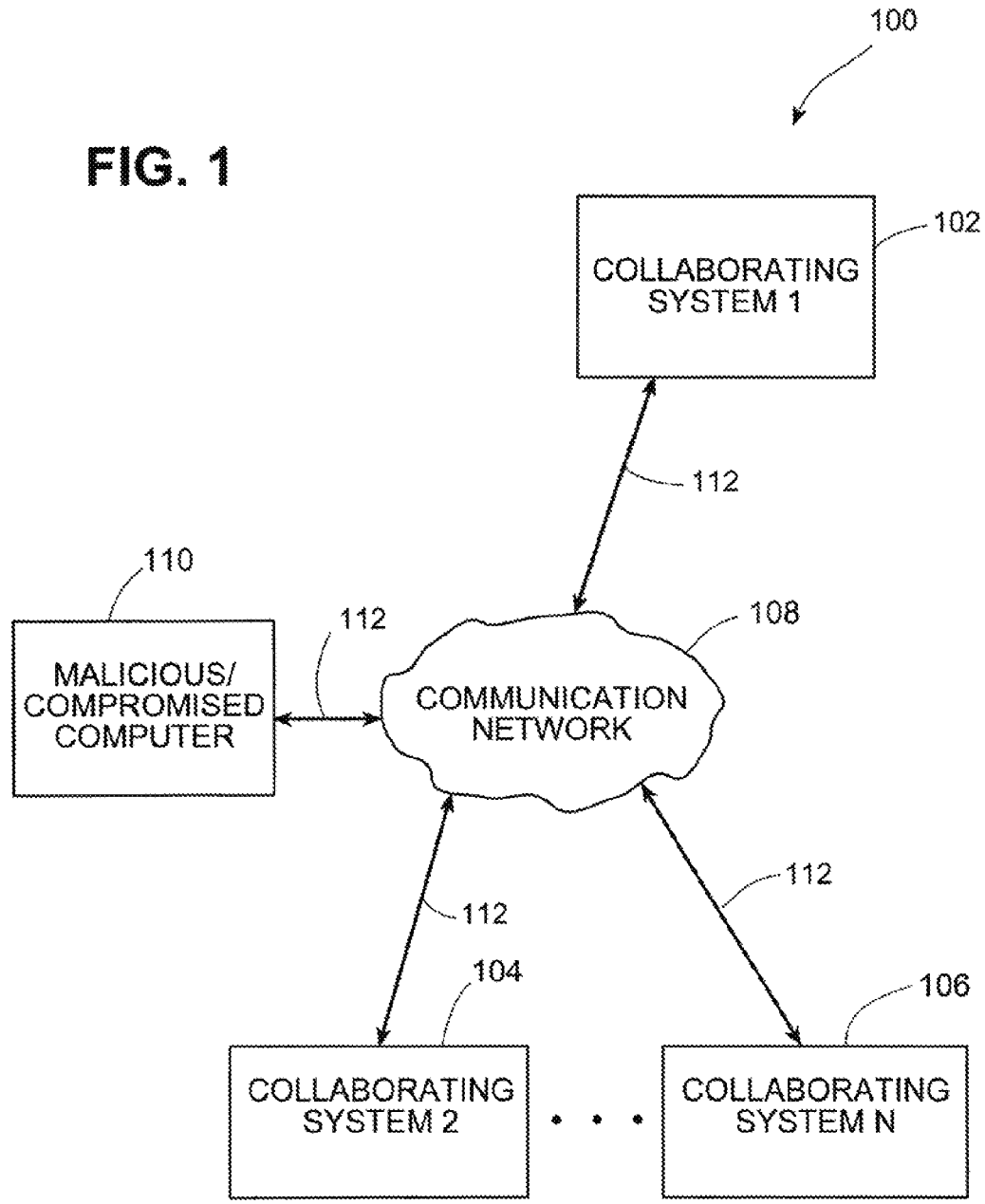
FIG. 1 is a block diagram of a system for implementing certain embodiments of the present invention.

FIG. 1 illustrates one embodiment of a system 100 in which the present invention may be implemented. As shown, system 100 includes multiple collaborating computer systems 102, 104, and 106, a communication network 108, a malicious/compromised computer 110, and communication links 112.

Collaborating systems 102, 104, and 106 may be systems owned, operated, and/or used by universities, businesses, governments, non-profit organizations, families, individuals, and/or any other suitable person and/or entity. As set forth more fully in connection with FIG. 2, collaborating systems 102, 104, and 106 may include any number of user computers, servers, firewalls, routers, switches, gateways, wireless networks, wired networks, intrusion detection systems, alert correlator systems, alert distributor systems, and any other suitable devices. Any number (including only one) of collaborating systems 102, 104, and 106 may be present in system 100, and systems 102, 104, and 106 may be identical or different.

Communication network 108 may be any suitable network for facilitating communication among computers, servers, etc. For example, communication network 108 may include private computer networks, public computer networks (such as the Internet), telephone communication systems, cable television systems, satellite communication systems, wireless communication systems, any other suitable networks or systems, and/or any combination of such networks and/or systems.

Malicious/compromised computer 110 may be any computer, server or other suitable device for launching a computer threat such as a virus, worm, trojan, etc. The owner of malicious/compromised computer 110 may be any university, business, government, non-profit organization, family, individual, and/or any other suitable person and/or entity. The owner of computer 110 may not be aware of what operations computer 110 is performing or may not be in control of computer 110. Computer 110 may be acting under the control of another computer or autonomously based upon a previous computer attack which infected computer 110 with a virus, worm, trojan, etc. Alternatively, computer 110 may be operated by an individual or organization with nefarious intern. Although only one malicious/compromised computer 110 is shown, any number of computers 110 may be present in system 100.

Communication links 112 may be any suitable mechanism for connecting collaborating systems 102, 104, and 106 and malicious/compromised computer 110 to communication network 108. Links 112 may be any suitable wired or wireless communication link, such as a T1 or T3 connection, a cable modem connection, a digital subscriber line connection, a WiFi or 802.11(a), (b), or (g) connection, a dial-up connection and/or any other suitable communication link. Alternatively, communication links 112 may be omitted from system 100 when appropriate, in which case systems 102, 104, and/or 106 and/or computer 110 may be connected directly to network 108.

Figure 2:
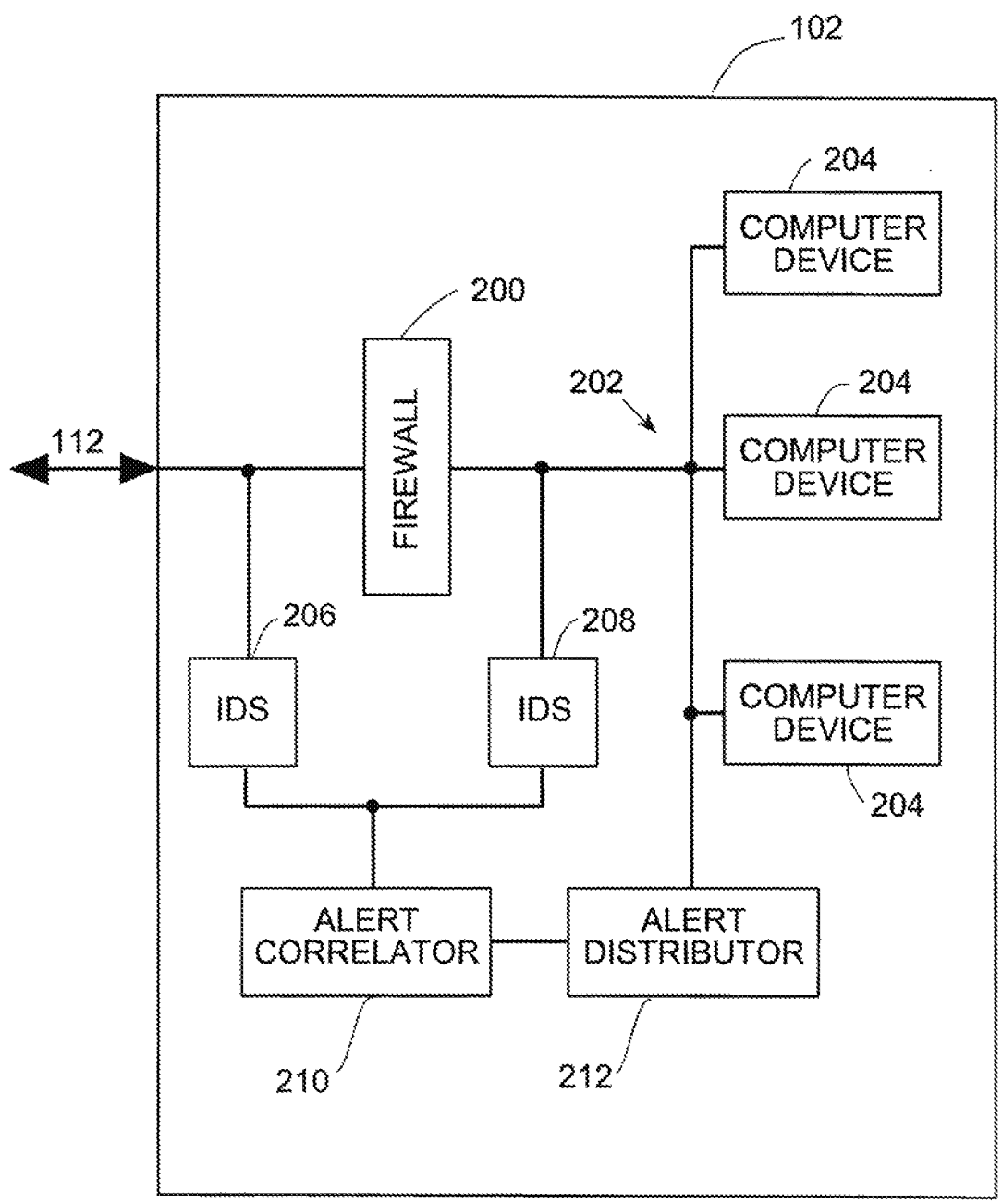
FIG. 2 is a block diagram of a collaborating system in accordance with certain embodiments of the present invention.

Turning to FIG. 2, one example of a collaborating system 102, 104, and 106 (illustrated as collaborating system 102) is described in more detail. As shown, system 102 may include a firewall 200, an internal network 202, one or more computer device 204, one or more intrusion detection systems 206 and 208, an alert correlator 210, an alert distributor 212, and any other suitable device, or any subset of these devices. Firewall 200 may be any suitable hardware and/or software firewall as known in the art. Internal network 202 may be any suitable wired or wireless computer network, buss, communication link, etc. as known in the art. Computer devices 204 may be any suitable computer, server, personal digital assistant, handheld computer, wireless phone, other wireless device, or any other device or combination of devices. Intrusion detection system (IDS) 206 may be any suitable hardware and/or software for detecting intrusion attempts outside firewall 200, such as Antura Recon from System Detection Inc., New York, N.Y. Intrusion detection system (IDS) 208 may be any suitable hardware and/or software for detecting intrusion attempts inside firewall 200, such as a honey pot or an anomalous payload detection system as described in U.S. Patent Application Nos. 60/518,742 and 60/551,732, respectively filed Nov. 12, 2003 and Mar. 9, 2004, both of which are hereby incorporated by reference herein in their entirety.

Alert correlator 210 and alert distributor 212 may be any suitable hardware and/or software for performing the functions described herein. For example, correlator 210 and distributor 212 may be implemented on personal computer executing the Linux operating system, a database, and software to implement the corresponding correlation and distribution functions described herein. As illustrated in FIG. 2, alert correlator 210 may receive input from IDS 206 and/or IDS 208. By receiving input from IDS 206, which is outside firewall 200 in system 102, alert correlator 210 may be able to process all alerts that reach system 102, not just alerts corresponding to those threats that pass though firewall 200. Alerts that do pass through the firewall, or are generated internally to system 102, may additionally or alternatively be detected by IDS 208 and passed to alert correlator 210.

As known in the art, the sub-systems 200-212 of system 102 may be implemented as separate devices or may be implement as functions being performed in one device, or any number of devices.

Figure 3:
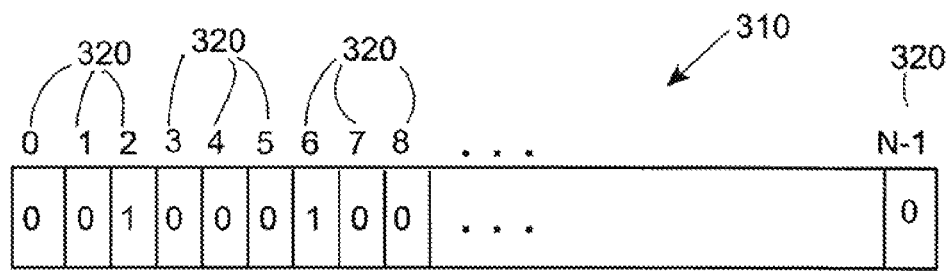
FIG. 3 is an illustration of a bloom filter in accordance with certain embodiments of the present invention.
Figure 4:
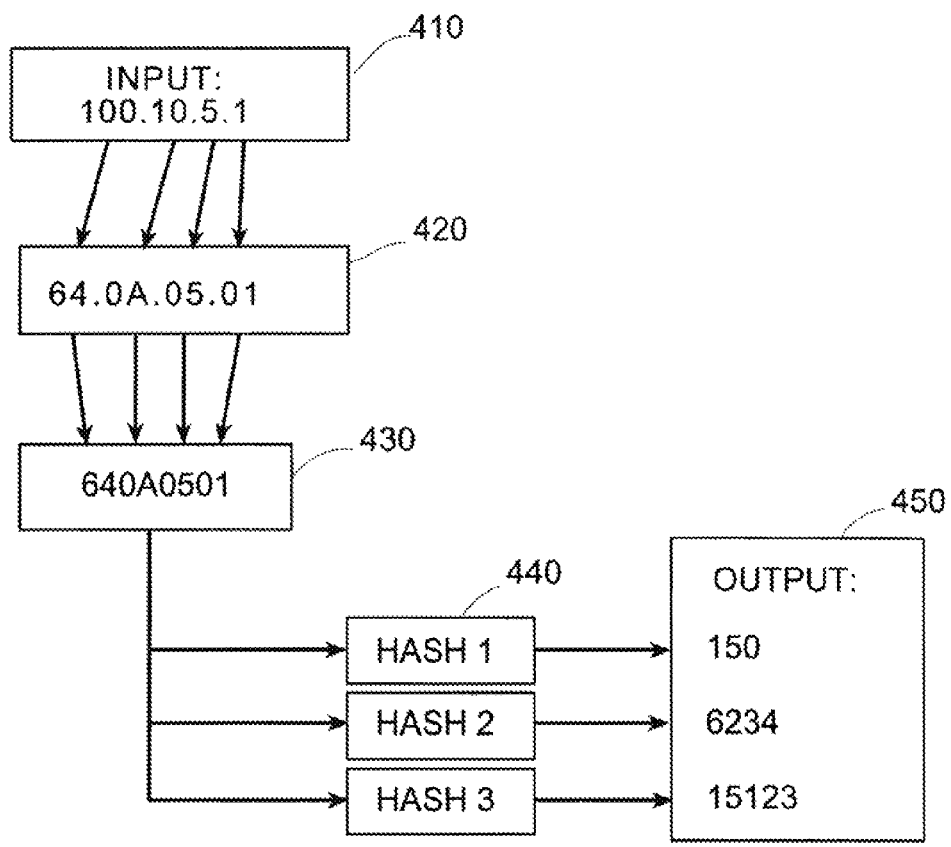
FIG. 4 is a flow diagram showing one example of converting an IP address to a set of hash values in accordance with certain embodiments of the present invention.
Figure 5:
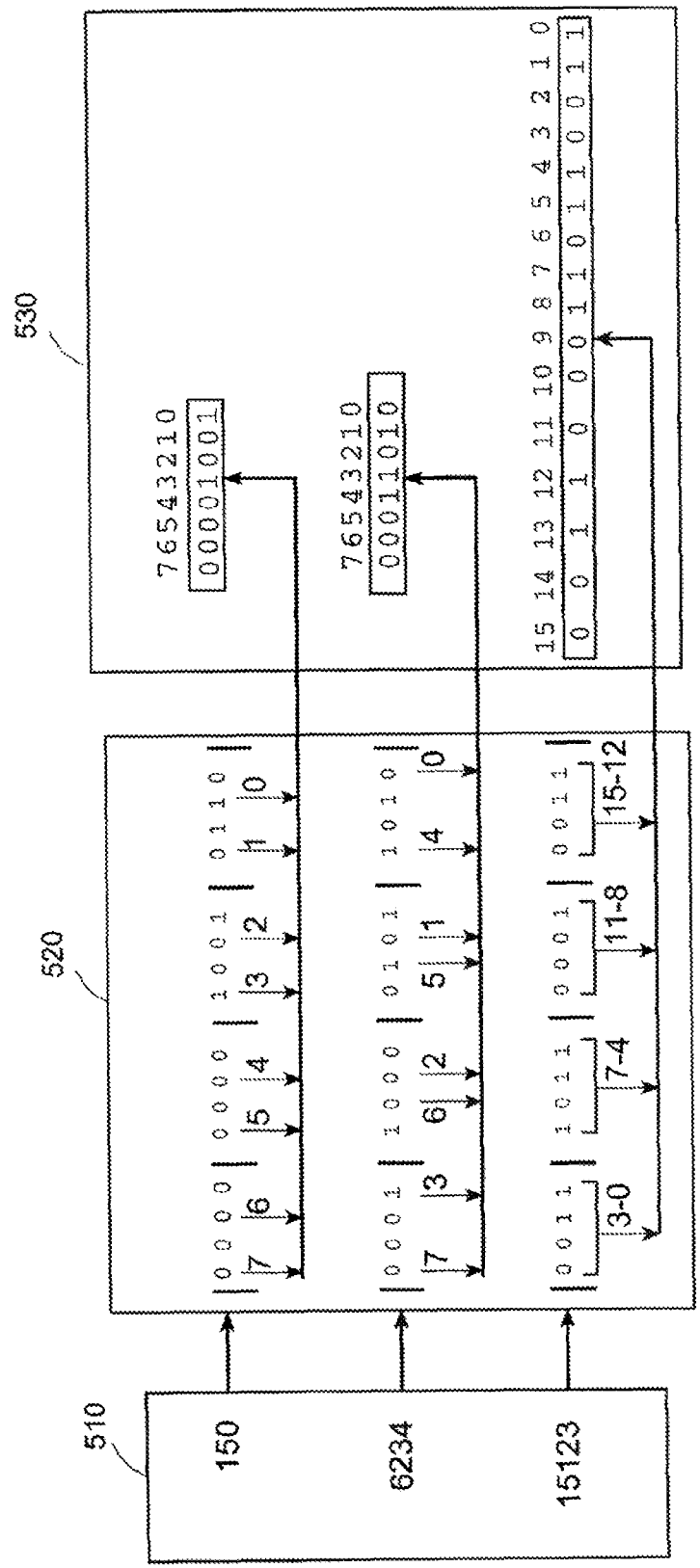
FIG. 5 is a flow diagram showing one example of converting a set of hash values to indexes to a bloom filter in accordance with certain embodiments of the present invention.

FIGS. 3, 4, and 5 illustrate example bloom filters and how they may be used in connection with the present invention. Although the present invention is illustrated in the figures as being implemented using bloom filters, any suitable one-way or non-one-way data structure may be used in accordance with the present invention. For example, in instances when keeping stored data (e.g., IP addresses) hidden is not critical, non-one-way data structures (e.g., trees, arrays, etc.) may be used in accordance with the invention. For example, government entities may not mind having IP addresses of potential attackers exchanged between them. In such cases, an array may be used instead of a bloom filter, and the IP address of a potential threat may be encoded (using a reversible technique) and used to index the array. The arrays may be filled with the same data that is stored in the bloom filter (e.g., zero, one, or a value representative of information related to a threat), and may be associated with the type of threat as shown in FIG. 6, as described below.

As shown in FIG. 3, a bloom filter may be implemented as an N-bit word 310. For example, N may be in the range of $2^{15}$ to $2^{20}$. When first initialized, all bits 320 in the bloom filter may be set to, zero. Based on the alerts that are detected, certain bits in the bloom filter (e.g., bits 2 and 6) may then be set to one.

Turning to FIGS. 4 and 5, an example of steps for setting bits in a bloom filter based upon an input IP address are shown. As illustrated in FIG. 4, after an IP address 100.10.5.1 is received at step 410, the components of the IP address may first be converted to hexadecimal form—i.e., 64.0A.05.01— at step 420. These components may then be combined together to form one word—i.e., 640A0501—at step 430. This combined word may than be hashed using any one or more hashing algorithms (as known in the art) at step 440. For example, as shown, three hashing algorithms may be used. As illustrated, the outputs of the hashing algorithms may be any corresponding numbers—e.g., 150, 6234, and 15123—at step 450. As illustrated in FIG. 5, these numbers (as shown at step 510) may be converted to binary form as 0000000010010110, 0001100001011010, and 0011101100010011, respectively (as shown at step 520). Next, different parts of these binary numbers may be selected for the bloom filter indexes (as shown at step 530). For example, as illustrated, alternating bits of the binary form of the number 150 may be selected to form an index 00001001, half of the bits of the binary number 6234 may be rearranged to form an index 00011010, and each nibble of the binary number 15123 may be rearranged to form an index 0011000110110011. These indexes may then be used to select bits to be set or reset in the bloom filter based upon whether a threat corresponding to the input data (e.g., an IP address) has been detected or not.

By selecting multiple hashes of the same input and using multiple hash-bit-selection and hash-bit-rearrangement techniques, the bloom filters are more resilient to noise and data saturation. Although particular hash selection, hash-bit-selection, and hash-bit-rearrangement techniques are shown in FIG. 5, any suitable configuration of hash selection and hash-bit-selection and hash-bit-rearrangement techniques, including not rearranging the hash bits, may be used in accordance with the present invention.

In certain embodiments of the present invention, it may be desirable to use, different bloom filters for storing information for different purposes. For example, as shown in table 600 of FIG. 6, different bloom filters numbered 1 through n (see column 610) may be used to store alerts corresponding to all collaborating systems, bank collaborating systems, government collaborating systems, internal attacks, external attacks, port 80 attacks, scan alerts, non-scan alerts, login attacks, today's attacks, yesterday's attacks, and/or any other suitable characteristics of the exchanged alerts (see column 620). The inputs to these bloom filters may be the source IP address corresponding to an alert or threat, a signature corresponding to an alert or threat, or any other suitable data (see column 630).

Although setting and resetting of bits in the bloom filters may be used to indicate the presence or non-presence of a threat, in certain embodiments of the invention, instead of setting and resetting bits, larger data values may also be used in the bloom filters to store information. For example, when no threat is present, the value may still be set to zero, but when a threat is present, the value may be set to the size of a datagram associated with the threat, the port number being targeted by the threat, a measure of the "stealthiness" of the threat, and/or any other suitable information. By properly encoding the values being stored, any suitable data or combination of data may be stored in a bloom filter. Obviously, using bit values in the bloom filter has the advantage of keeping the data structure smaller that if other size values were stored, thereby speeding-up data distribution.

In this way, the present invention not only correlates attacks, but it also develops a "profile" of the attacks. This profile information may be useful to a collaborating system in inferring the intent of an attack and determining how to respond to a detected attack. For example, if a collaborating system is operated by a bank, and an attack has been detected from an IP address on other banks, but no other collaborating systems, the bank may respond by blocking all traffic from a corresponding IP address at its firewall, contact suitable authorities, etc. Whereas with an attack that is being detected by a wide variety of types collaborating systems (e.g., banks, universities, and governments), the bank may simply decide to filter traffic based upon a signature of the threat.

Figure 7:
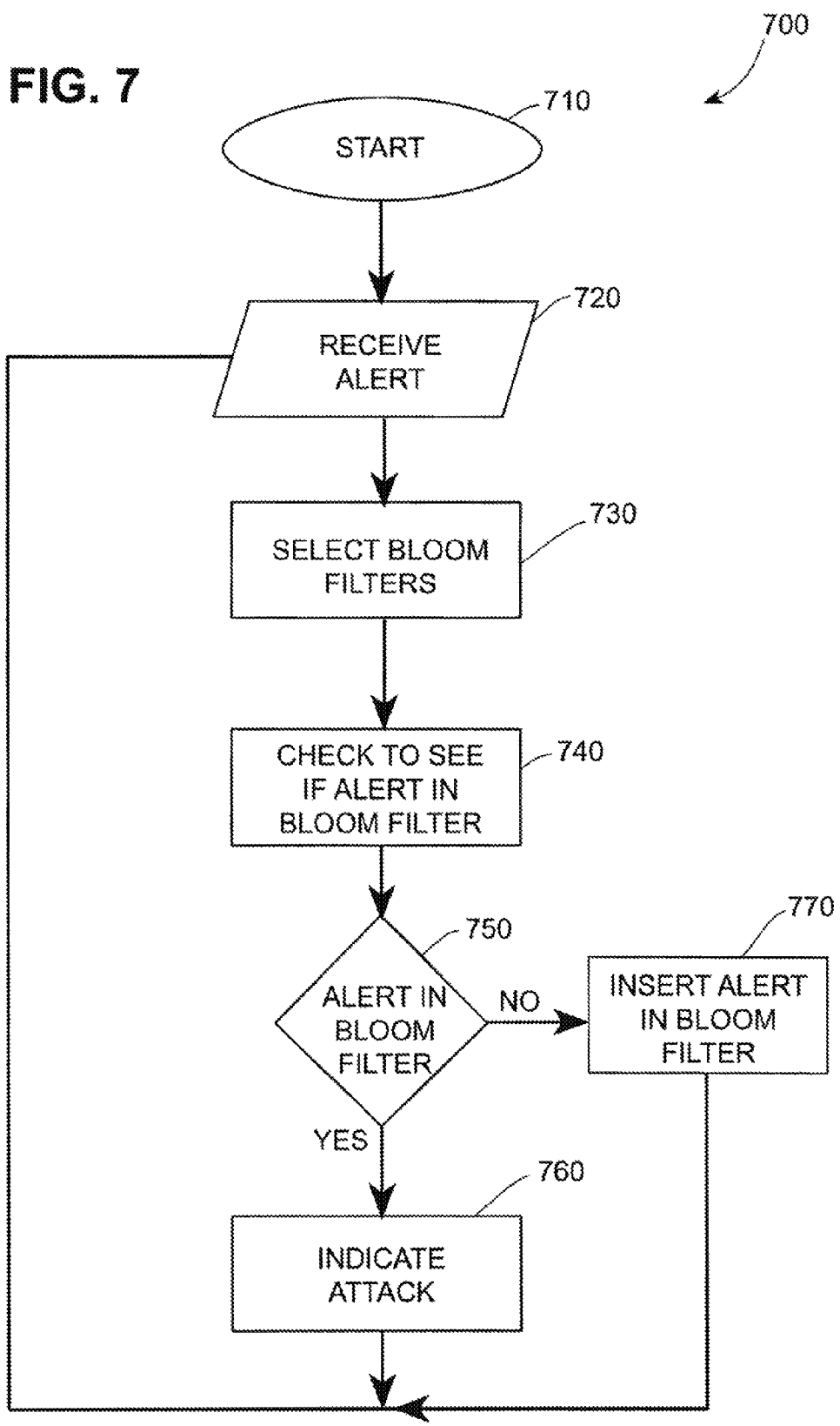
FIG. 7 is a flow diagram of an alert correlator process in accordance with certain embodiments of the present invention.

FIG. 7 illustrates a process 700 that may be performed by alert correlator 210. As shown, after process 700 begins at step 710, the process waits for and receives an alert at step 720 from IDS 206 or 208. This may be accomplished by retrieving the alert from a database connected to or part of IDS 206 or IDS 208. This alert may be generated by an IDS 206 or 208, and may be indicative of any type of reconnaissance, attack, or anomalous activity. Once an alert has been received, process 700 may select one or more bloom filters corresponding to the alert at step 730. For example, as illustrated in FIG. 6, one bloom filter may be provided for attacks on port 80, another bloom filter may be provided for scan alerts, yet another bloom filter may be provided for all alerts, etc. By providing different bloom filters for different types of attacks, the bloom filter may be able to provide a "profile" of the attack—that is, if a bloom filter indicates a possible attack, and the bloom filter is a "scan attack" bloom filter, the profile of the attack is known to include that the alert is a "scan attack." Next at step 740, process 700 may determine whether a corresponding alert has been previously entered in any of the selected bloom filters. An example of such a sub-process is described below in connection with FIG. 8. The check may be made to determine whether an alert is correlating with a previous alert from the same system or whether an alert is correlating with a previous alert from another system based, for example, on which bloom filters are selected. If the alert is determined to have been found in a bloom filter, at step 750, process 700 branches to step 760 where any suitable response to an attack may be taken. For example, at step 760, process 700 may attempt to defend its local system (e.g., system 102) from the attack by: alerting a system administrator of an attack; shutting-down firewall 200; blocking all traffic from the corresponding IP address; generating a firewall filter rule based on a datagram of the threat, a signature of the threat, an IP address of threat, the destination port targeted, and/or the datagram length associated with the threat; and/or performing any other suitable action known in the art. Process 700 may also attempt to help other collaborating systems (e.g., systems 104 or 106) defend against the attack by alerting other collaborating systems 104 and 106 of the attack by providing them with a firewall filter rule and/or information about the attack, such as the kind of attack (e.g., scanning, probing, etc.), a datagram of the threat, a signature of the threat, an IP address of the attack, the destination port/service targeted, the length of the datagram associated with the threat, type of other collaborating systems that have detected the threat, a measure of the "stealthiness" of the threat, and/or any other profile information related to the threat that may be useful in preventing, detecting, responding to, and/mitigating the effects of the attack.

If the alert is determined not to have been found in a bloom filter, at step 750, process 700 branches to step 770 where the alert is entered into the selected bloom filters. An example of such a sub-process is described below in connection with FIG. 9.

Figure 8:
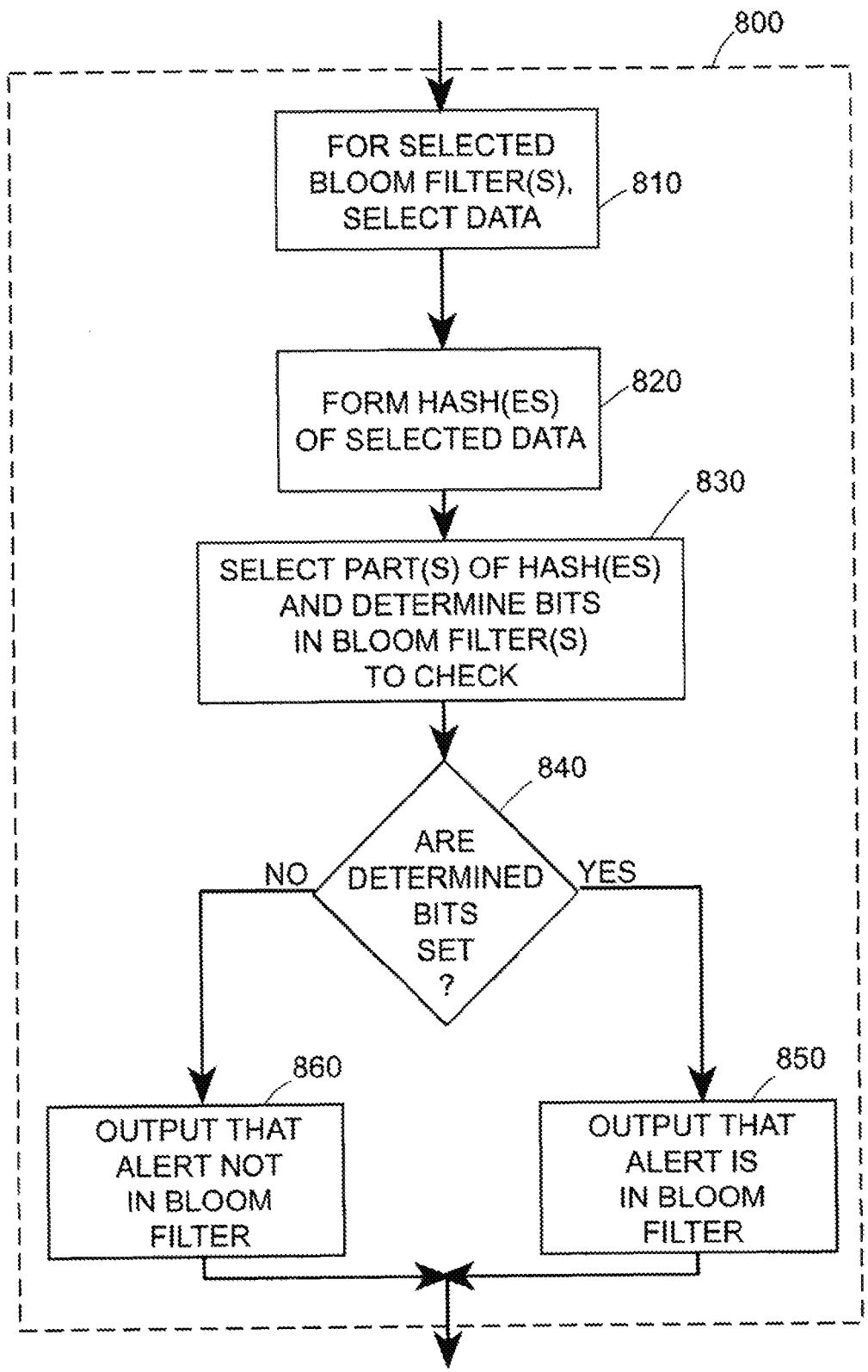
FIG. 8 is a flow diagram of a bloom filter checking process in accordance with certain embodiments of the present invention.

Turning to FIG. 8, a sub-process 800 corresponding to step 740 for determining whether a corresponding alert has been previously entered in any of a set of selected bloom filters is shown. As illustrated, at step 810, for each selected bloom filter, sub-process 800 selects the data to be used for that bloom filter. For example, for bloom filter 1 in FIG. 6, as shown in column 630, the input data is the source IP address corresponding to the alert or threat. Next, at step 820, sub-process 800 forms one or more hashes of the selected data. Any suitable hashing functions known in the art may be used in step 820, such as SHA-1, MD-5, etc. Sub-process 800 then may select one or more parts of the hashes and, based on the selected parts of the hashes, determine which bits in the bloom filters need to be checked. The specific hash functions and parts of the hash functions to be used may be kept as a shared secret among the collaborating systems. Next, at step 840, the bits in the bloom filters are checked, and if the bits are not already set, then sub-process 800 branches to step 860 which outputs that a corresponding alert has not been found in the bloom filters. Otherwise, sub-process 800 branches to step 850 which outputs that a corresponding alert has been found in the bloom filters.

Figure 9:
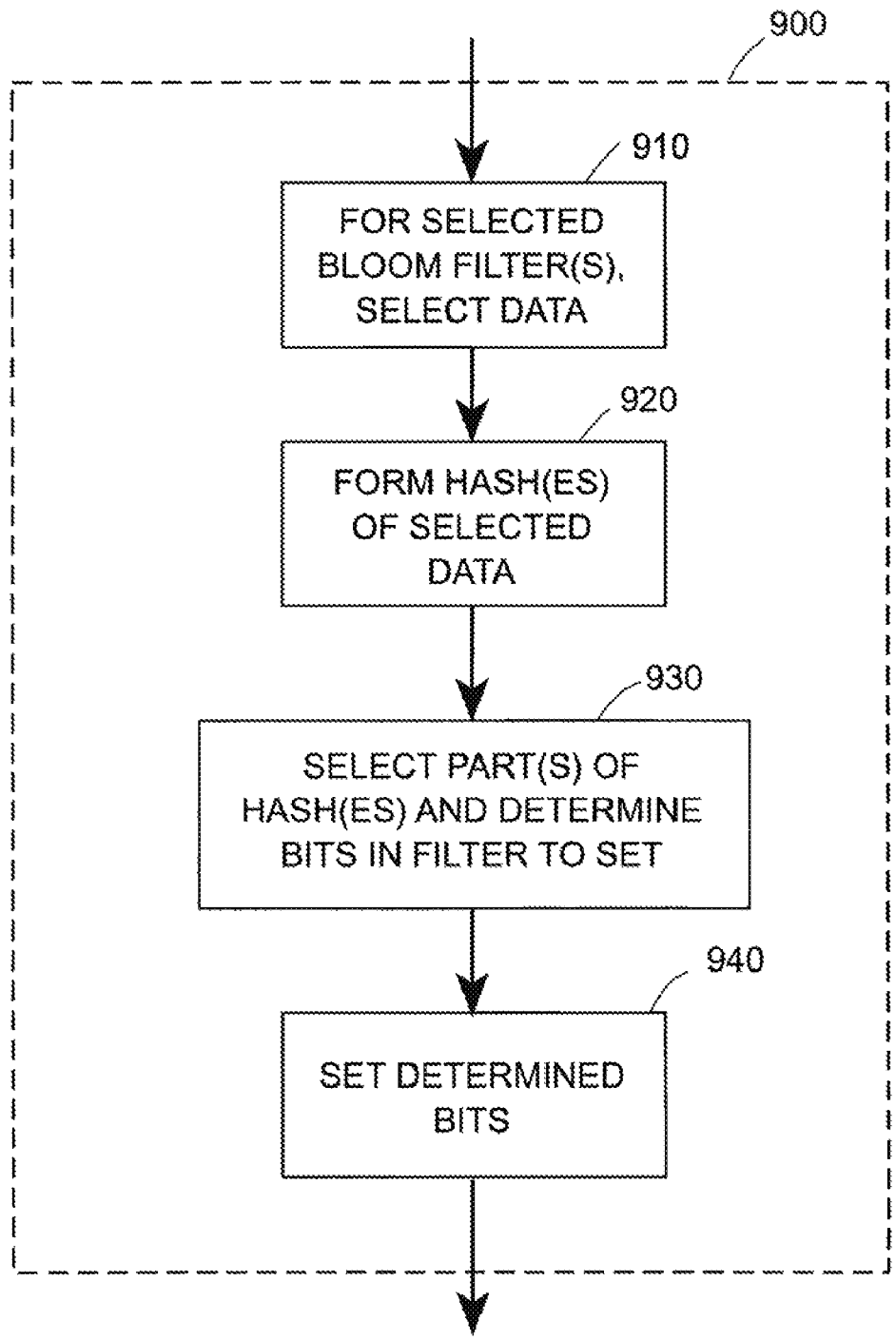
FIG. 9 is a flow diagram of a bloom filter insertion process in accordance with certain embodiments of the present invention.

As shown in FIG. 9, a sub-process 900 corresponding to step 770 for inserting an alert into a bloom filter is illustrated. Beginning at step 910, sub-process 900 selects the data to be used as inputs for the selected bloom filters. For example, for bloom filter 1 in FIG. 6, as shown in column 630, the input data is the source IP address corresponding to the alert or threat. Next, at step 920, hashes of this data are formed, as described above. Then, at step 930, the sub-process selects one or more parts of the hashes and determines which bits in the bloom filter to set, as also described above. Finally, at step 940, the determined bits are set in the bloom filters.

Figure 10:
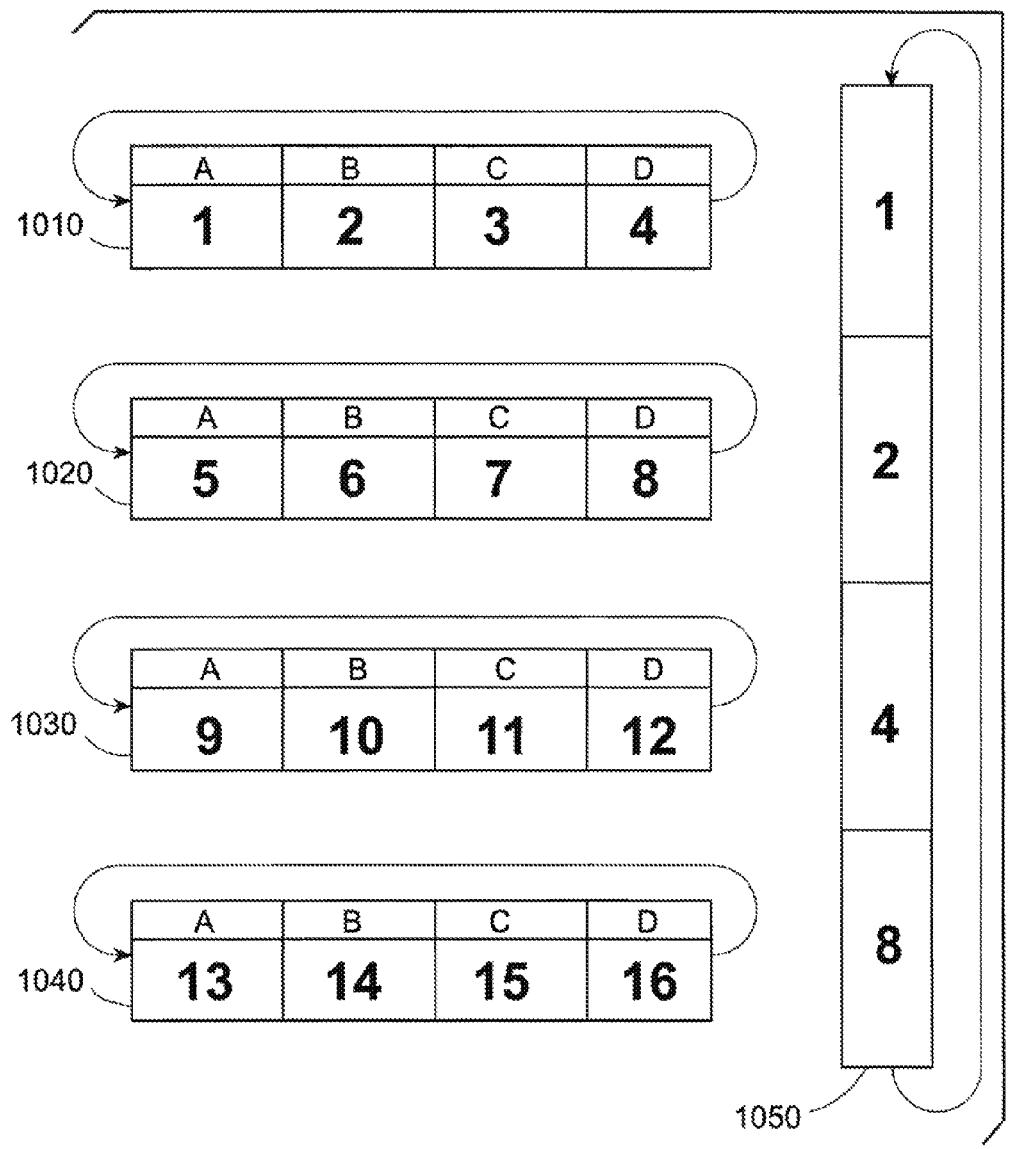
FIG. 10 is a block diagram of an alert distributor process in accordance with certain embodiments of the present invention.
Figure 11:
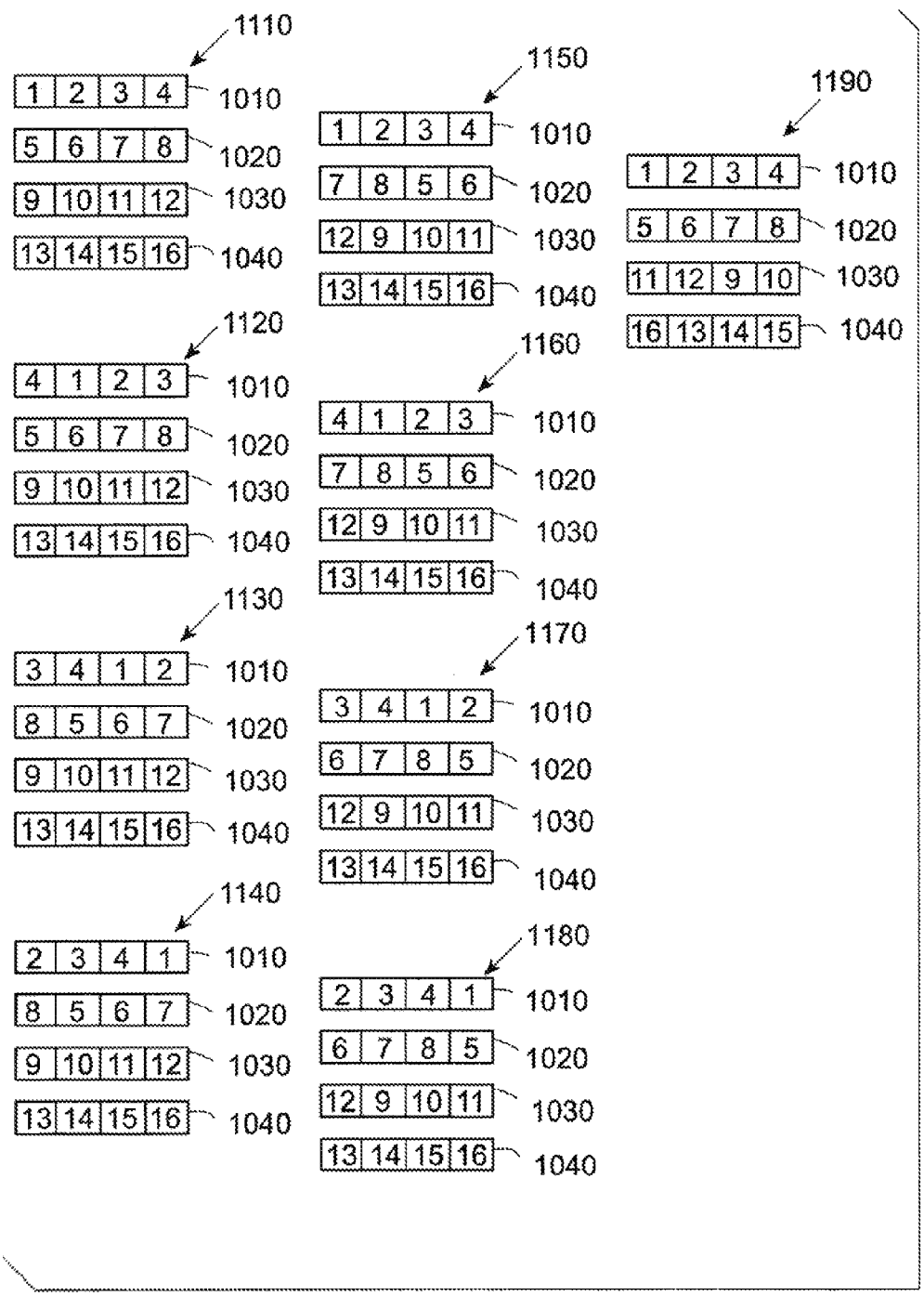
FIG. 11 is an illustration of different states of an alert distributor process in accordance with certain embodiments of the present invention.
Figure 12:
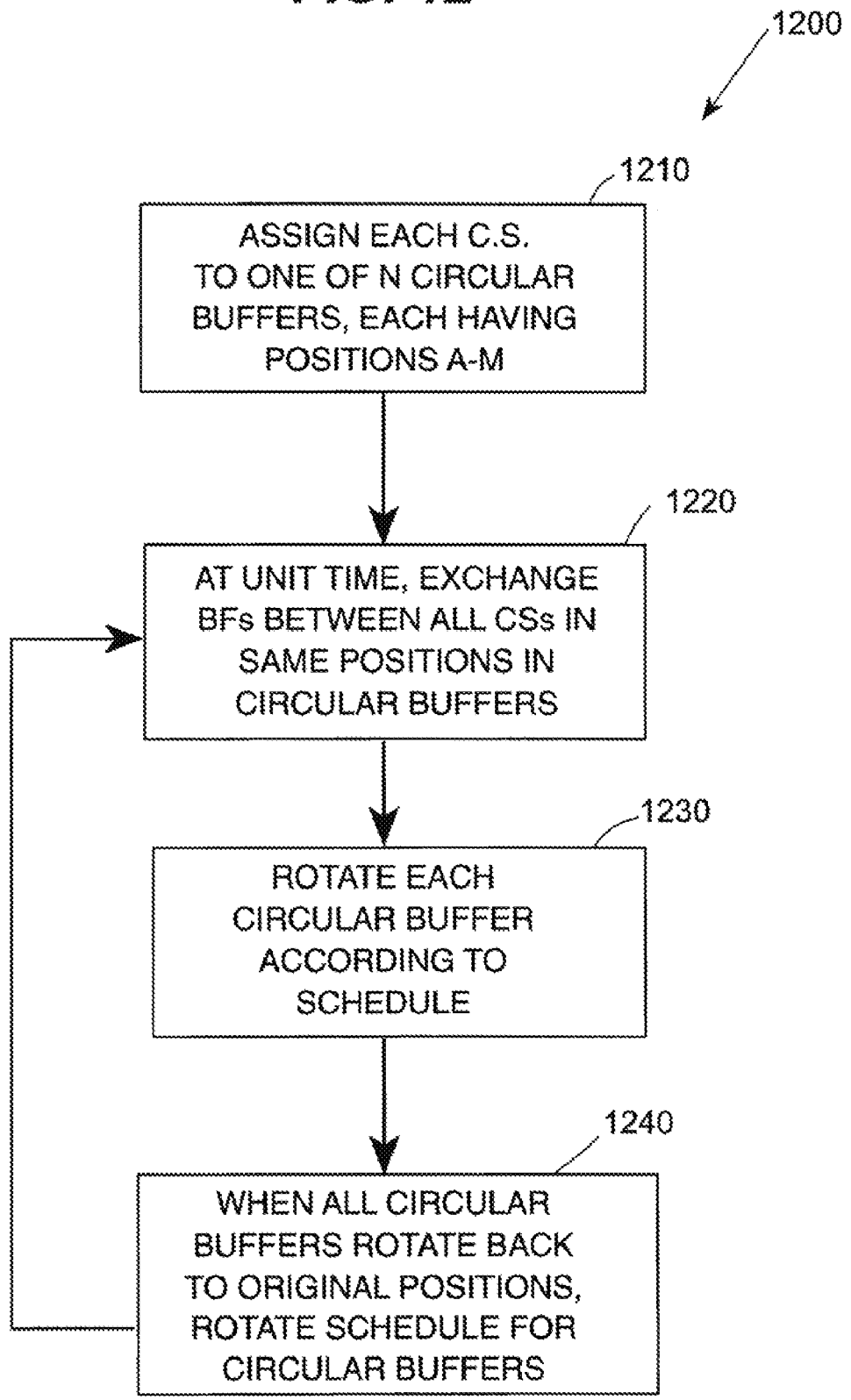
FIG. 12 is a flow diagram of an alert distributor process in accordance with certain embodiments of the present invention.

As stated above, an alert distributor 212 may be used to distribute alert information, such as bloom filters, between collaborating systems. Although any suitable data distribution mechanism, such as a peer-to-peer network or a central server for storage and retrieval, may be used in accordance with the present invention, in order to securely and efficiently distribute this information, the distribution mechanism illustrated in FIGS. 10-12 is preferably used. As shown in FIG. 10, any number of circular buffers 1010-1040 may be used to form groups of collaborating systems. For example, buffer 1010 groups collaborating systems 1, 2, 3, and 4, buffer 1020 groups collaborating systems 5, 6, 7, and 8, buffer 1030 groups collaborating systems 9, 10, 11, and 12, and buffer 1040 groups collaborating systems 13, 14, 15, and 16. Each collaborating system identified in the same position A, B, C, or D in buffers 1010-1040 is considered to be in the same family. For example, collaborating systems 1, 5, 9, and 13 are in the same family, systems 2, 6, 10, and 14 are in the same family, systems 3, 7, 11, and 15 are in the same family, and systems 4, 8, 12, and 16 are in the same family. At least once each unit time (which may be any suitable period of time, e.g., one second, two minutes, half hour, etc.), each member of a family exchanges alert information (e.g., bloom filters) with other members of that family. This exchange may be done using any suitable technique. In order to prevent false bloom filters from being distributed by nefarious computers, the bloom filters may be digitally signed by the senders and then verified by the recipients.

Another circular buffer 1050 having as many positions as there are circular buffers 1010-1040 may be used to indicate the rotation rate for buffers 1010-1040. For example, as shown, circular buffer 1050 has four positions corresponding to the four circular buffers 1010-1040, and these positions are filled with numbers 1, 2, 4, and 8 indicating that buffers 1010, 1020, 1030, and 1040 will advance one position every 1, 2, 4, and 8 units time, respectively. Obviously, any suitable rotation rates could be used in accordance with the present invention. For example, buffer 1040 may be advanced one position every ten units time, buffer 1030 may be advanced one position every nine units time, buffer 1020 may be advanced one position every eight units time, and buffer 1010 may be advanced one position every seven units time. Preferably, the rotation schedule is difficult to guess or predict. Each time the least frequently rotating buffer (e.g., buffer 1040) has completed a full rotation and returned to its original order, circular buffer 1050 will advance one position to cause the next buffer (e.g., buffer 1010) to become the least frequently rotating buffer.

Turning to FIG. 11, an illustration of the rotation process is shown. As can be seen, circular buffers 1010-1040 are in their original positions in state 1110. Next at state 1120, circular buffer 1010 has advanced one position. At state 1130, circular buffer 1010 has rotated a total of two positions and buffer 1020 has advanced one position. Next at state 1140, circular buffer 1010 has rotated a total of three positions. At state 1150, circular buffer 1010 has completed a full rotation and returned to its original position, circular buffer 1020 has advanced a total of two positions, and circular buffer 1030 has advanced one position. This process continues through states 1160, 1170, 1180, 1190, and other states not shown until circular buffers 1010-1040 return to the positions shown in state 1110, at which point the process repeats itself.

Although FIGS. 10 and 11 illustrate four circular buffers 1010-1040, each containing four positions, any suitable number of circular buffers containing any suitable number of positions may be used in accordance with the present invention. For example, N (e.g., nine) circular buffers may be used, and each buffer may contain $\sqrt{N}$ (e.g., three) positions. Moreover, although circular buffers are described herein, any suitable data structure that facilitates associating groups and families of collaborating systems may be used in accordance with the invention.

This distribution process is illustrated as a process 1200 in FIG. 12. Beginning at step 1210, process 1200 assigns each collaborating system to one of N circular buffers, each having a position A through M. This assignment may be performed, for example, by performing a hash function on each collaborating system's IP address to provide a circular buffer number to which the collaborating system should be assigned. Next, at step 1220, at each unit time, process 1200 exchanges bloom filters between all collaborating systems in the same positions A through M. In order to prevent false bloom filters from being distributed by nefarious computers, the bloom filters may be digitally signed by the senders and then verified by the recipients. Then at step 1230, process 1200 rotates each circular buffer according to the corresponding schedule for that buffer. Finally, at step 1240, when all circular buffers have rotated back to their original positions, process 1200 rotates the schedule for rotating the N circular buffers and returns to step 1220.

To further protect the security and anonymity of the data being exchanged by the collaborating systems, a central authority may operate a trusted proxy server or other data exchange mechanism that is used to exchange data between the systems. In this way, no collaborating system would be able to determine the IP address of a collaborating system from which it is receiving information. In such a case, however, the central authority may assign and the collaborating systems may know the category or type of system (e.g., a bank, university, government, etc.) with which it is exchanging data. This category may be based on SIC codes or any other suitable mechanism. In this way, the systems would be better able to evaluate a profile of a threat and thereby infer the intent of the threat. The central authority may also assign encryption keys used by the collaborating systems. Furthermore, the central authority may provide the same alert correlation and alert distribution functions described herein as being performed by the collaborating systems. In such a case, it may not be necessary to hide data (e.g., IP addresses of possible threats) being provided to the central authority by each collaborating system because the authority is trusted to maintain that data in confidence.

Figure 13:
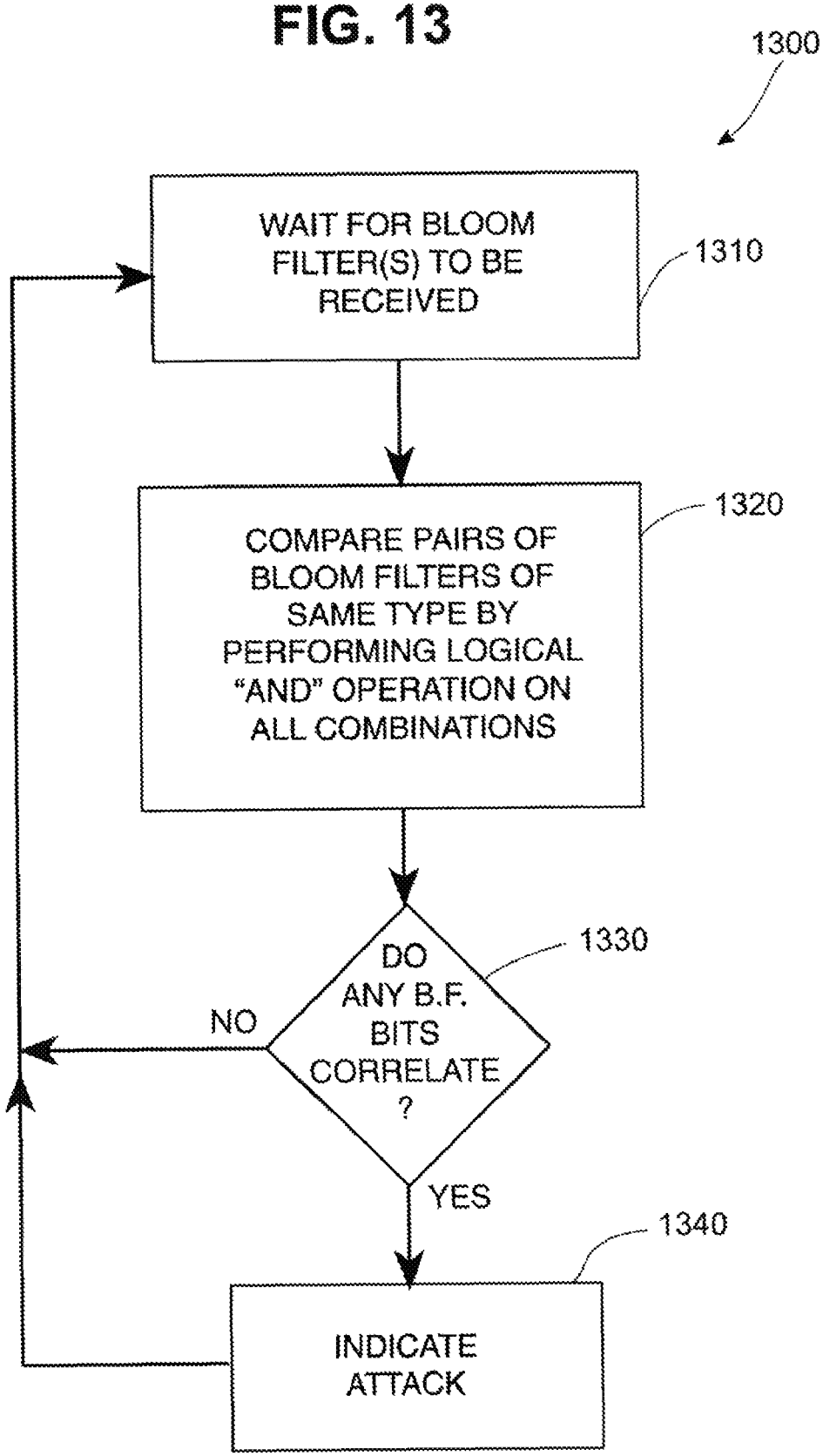
FIG. 13 is a flow diagram of a process for processing bloom filters received from an alert distributor process in accordance with certain embodiments of the present invention.

FIG. 13 is a flow diagram of a process 1300 that may be used to process bloom filters received at a collaborating system by way of an alert distributor. As shown, at step 1310, process 1300 waits for a bloom filter to be received. These bloom filters may replace bloom filters previously received from the same source collaborating system. These bloom filters may also be checked as part of the process illustrated in FIGS. 7 and 8. Next, at step 1320, the process compares pairs of bloom filters of the same type for like alerts by performing a logical "AND" operation. Any resulting set bits may indicate a potential threat. As step 1330, process 1300 determines whether any bloom filter bits correlate, and if not, the process loops back to step 1310. Otherwise, process 1300 branches to step 1340 where an attack may be indicated using any suitable technique as described above. For example, a collaborating system may attempt to defend its local system (e.g., system 102) from the attack by: alerting a system administrator of an attack; shutting-down firewall 200; blocking all traffic from the corresponding IP address; generating a firewall filter rule based on a datagram of the threat, a signature of the threat, an IP address of threat, the destination port targeted, and/or the datagram length associated with the threat; and/or performing any other suitable actions known in the art. A collaborating system may also attempt to help other collaborating systems (e.g., systems 104 or 106) defend against the attack by alerting other collaborating systems 104 and 106 of the attack by providing them with a firewall filter rule and/or information about the attack, such as the kind of attack (e.g., scanning, probing, etc.), a datagram of the threat, a signature of the threat, an IP address of the attack, the destination port/service targeted, the length of the datagram associated with the threat, type of other collaborating systems that have detected the threat, a measure of the "stealthiness" of the threat, and/or any other profile information related to the threat that may be useful in preventing, detecting, responding to, and/mitigating the effects of the attack.

In order to prevent false alerts due to bloom filter saturation, the filters may be periodically cleared. Alternatively, instead of using bits with a value of one to represent specific alerts, the bloom filters may use a time value representative of the date or time that an alert has been detected. Then, over time, the value may be updated when a correlating alert is detected or the value may be set to zero when no correlating alert is detected. When suitable, the time value may be combined with other data in the bloom filter and decoded as appropriate.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

What is claimed is:

1. A method of detecting a threat to a computer system in a plurality of collaborating computer systems, the method comprising:
    receiving, at a first computer system, a first one-way data structure from a collaborating second computer system, the first one-way data structure representing first data relating to a first intrusion attempt detected by an intrusion detection system of the collaborating second computer system such that the first data is hidden in the first one-way data structure;
    detecting, using an intrusion detection system of the first computer system, a second intrusion attempt;
    identifying second data relating to the second intrusion attempt that is not to be revealed to another computer system;
    selecting a second one-way data structure of the first computer system based on at least one characteristic of the second data;
    storing the second data in the second one-way data structure such that the second data is hidden in the second one-way data structure so as not to be revealed to the other computer system;
    determining whether the second intrusion attempt correlates with the first intrusion attempt by comparing the first data structure and the second data structure; and
    indicating that a threat is present if the second intrusion attempt is determined to correlate with the first intrusion attempt.

2. The method of claim 1, wherein the first data forms at least part of a profile of the first intrusion attempt.

3. The method of claim 2, further comprising responding to the threat based on the profile of the first intrusion attempt.

4. The method of claim 1, wherein receiving the first one-way data structure from the collaborating second computer system comprises periodically exchanging one-way data structures with the collaborating second computer system.

5. The method of claim 4, wherein the one-way data structures are exchanged through at least one proxy.

6. The method of claim 4, further comprising:
    grouping the collaborating second computer system and other collaborating systems into groups so that each collaborating system in a group occupies a position in that group;
    exchanging one-way data structures between collaborating systems in the same position in the different groups; and
    rotating the position occupied by each member of at least one of the groups according to a schedule.

7. The method of claim 6, further comprising changing the schedule.

8. The method of claim 1, wherein the second intrusion attempt is one of a scan and probe.

9. The method of claim 1, wherein the second intrusion attempt is a blocked worm.

10. The method of claim 1, wherein the intrusion detection system is a honey pot.

11. The method of claim 1, wherein the first one-way data structure is a bloom filter.

12. The method of claim 11, wherein storing data relating to the second intrusion attempt in the second one-way data structure of the first computer system comprises:
    forming a hash of the second data relating to the second intrusion attempt;
    using the hash as an index to the bloom filter; and
    setting corresponding bits in the bloom filter based on the index.

13. The method of claim 12, wherein forming the hash comprises using at least one of the SHA-1 and the MD-5 hashing algorithms.

14. The method of claim 11, wherein storing data relating to the second intrusion attempt in the second one-way data structure of the first computer system comprises:
    forming a hash of the second data relating to the second intrusion attempt;
    selecting at least one portion of the hash;
    using the at least one portion of the hash as an index to the bloom filter; and
    setting corresponding bits in the bloom filter based on the index.

15. The method of claim 14, wherein forming the hash comprises using at least one of the SHA-1 and the MD-5 hashing algorithms.

16. The method of claim 1, wherein indicating that the threat is present comprises outputting an IP address of the source of the threat.

17. The method of claim 1, wherein indicating that the threat is present comprises causing a firewall to block traffic from an IP address of the source of the threat.

18. The method of claim 1, wherein indicating that the threat is present comprises outputting a signature associated with the threat.

19. The method of claim 1, wherein determining whether the second intrusion attempt correlates with the first intrusion attempt comprises:
    comparing bits of the first one-way data structure to corresponding bits of the second one-way data structure; and
    indicating a correlation if at least a predetermined number of corresponding bits are set to the same bit value.

20. A method of detecting a threat to a computer system in a plurality of collaborating computer systems, the method comprising:
    receiving, at a first computer system, a first one-way data structure from a collaborating second computer system, the first one-way data structure representing first data relating to a first intrusion attempt detected by an intrusion detection system of the collaborating second computer system such that the first data is hidden in the first one-way data structure;

receiving an indication of a characteristic of the collaborating second computer system;

detecting, using an intrusion detection system of the first computer system, a second intrusion attempt;

identifying second data relating to the second intrusion attempt that is not to be revealed to another computer system;

selecting a second one-way data structure of the first computer system based on at least one characteristic of the second data;

storing the second in the second one-way data structure such that the second data is hidden in the second one-way data structure so as not to be revealed to the other computer system;

determining whether the second intrusion attempt correlates with the first intrusion attempt by comparing the first data structure and the second data structure; and based on the characteristic of the collaborating second computer system, indicating that a threat is present if the second intrusion attempt is determined to correlate with the first intrusion attempt.

21. The method of claim 20, wherein the first data and the characteristic received from the collaborating second computer system form at least part of a profile of the first intrusion attempt.

22. The method of claim 21, further comprising responding to the threat based on the profile of the first intrusion attempt.

23. The method of claim 20, wherein the characteristic comprises the type of user of the collaborating system.

24. The method of claim 23, wherein the characteristic indicates that the user is a bank.

25. The method of claim 23, wherein the characteristic indicates that the user is a university.

26. The method of claim 20, wherein receiving the first data structure from the collaborating second computer system comprises periodically exchanging data structures with the collaborating second computer system.

27. The method of claim 26, wherein the data structures are exchanged through at least one proxy.

28. The method of claim 26, further comprising:
grouping the collaborating second computer system and other collaborating systems into groups so that each collaborating system in a group occupies a position in that group;
exchanging data structures between collaborating systems in the same position in the different groups; and
rotating the position occupied by each member of at least one of the groups according to a schedule.

29. The method of claim 28, further comprising changing the schedule.

30. The method of claim 20, wherein the second intrusion attempt is one of a scan and probe.

31. The method of claim 20, wherein the second intrusion attempt is a blocked worm.

32. The method of claim 20, wherein the intrusion detection system is a honey pot.

33. The method of claim 20, wherein the first data structure is a bloom filter.

34. The method of claim 33, wherein storing second data relating to the second intrusion attempt in a second data structure of the first computer system comprises:
forming a hash of the second data relating to the second intrusion attempt;
using the hash as an index to the bloom filter; and
determining whether a bit setting corresponding bits in the bloom filter based on the index.

35. The method of claim 34, wherein forming the hash comprises using at least one of the SHA-1 and the MD-5 hashing algorithms.

36. The method of claim 33, wherein storing second data relating to the second intrusion attempt in the second data structure of the first computer system comprises:
forming a hash of the second data relating to the second intrusion attempt;
selecting at least one portion of the hash;
using the at least one portion of the hash as an index to the bloom filter; and
setting corresponding bits in the bloom filter based on the index.

37. The method of claim 36, wherein forming the hash comprises using at least one of the SHA-1 and the MD-5 hashing algorithms.

38. The method of claim 20, wherein indicating that the threat is present comprises outputting an IP address of the source of the threat.

39. The method of claim 20, wherein indicating that the threat is present comprises causing a firewall to block traffic from an IP address of the source of the threat.

40. The method of claim 20, wherein indicating that the threat is present comprises outputting a signature associated with the threat.

41. A system configured to detect intrusion attempts in a computer system among a plurality of collaborating computer systems, comprising:
at least one server computer system that:
receives a first one-way data structure from a collaborating computer system, wherein the first one-way data structure represents first data relating to a first intrusion attempt detected by an intrusion detection system of the collaborating computer system such that the first data is hidden in the first one-way data structure;
detects a second intrusion attempt;
identifies second data relating to the second intrusion attempt that is not to be revealed to another computer system;
selects a second one-way data structure based on at least one characteristic of the second data;
stores the second data in the second one-way data structure such that the second data is hidden in the second one-way data structure so as not to be revealed to the other computer system;
determines whether the second intrusion attempt correlates with the first intrusion attempt by comparing the first one-way data structure and the second one-way data structure; and
indicates that a threat is present if the second intrusion attempt is determined to correlate with the first intrusion attempt.

42. The system of claim 41, wherein the at least one server, in determining whether the second data relating to the second intrusion attempt correlates with the data received from the collaborating second computer system relating to the first intrusion attempt, also:
compares bits of the first one-way data structure to corresponding bits of the second one-way data structure; and
indicates a correlation if at least a predetermined number of corresponding bits are set to the same bit value.

43. A system configured to detect intrusion attempts in a computer system among a plurality of collaborating computer systems, comprising:
at least one server computer system that:
receives a first one-way data structure from a collaborating computer system, wherein the first one-way data structure represents first data relating to a first intrusion attempt detected by an intrusion detection system of the collaborating computer system such that the first data is hidden in the first one-way data structure;
receives an indication of a characteristic of the collaborating computer system;
detects a second intrusion attempt;
identifies second data relating to the second intrusion attempt that is not to be revealed to another computer system;
selects a second one-way data structure based on at least one characteristic of the second data;
stores the second data in the second one-way data structure such that the second data is hidden in the second one-way data structure so as not to be revealed to the other computer system;
determines whether the second intrusion attempt correlates with the first intrusion attempt by comparing the first data structure and the second data structure; and
based on the characteristic of the collaborating computer system, indicates that a threat is present if the second intrusion attempt correlates with the first intrusion attempt.

44. A method of detecting a threat in a plurality of computer systems, the method comprising:
receiving, at a first computer system, a first one-way data structure from a second computer system, the first one-way data structure representing first data relating to a first intrusion alert detected at the second computer system such that the first data is hidden in the first one-way data structure;
storing second data in a second one-way data structure wherein the second data is hidden in the second one-way data structure;
comparing the first data structure and the second data structure;
detecting, at the first computer system, a third intrusion alert;
identifying third data relating to the third intrusion attempt that is not to be revealed to another computer system;
selecting a third one-way data structure based on at least one characteristic of the third data;
storing the third data in the third one-way data structure such that the third data is hidden in the third one-way data structure so as not to be revealed to the other computer system;
sending, from the first computer system, the third one-way data structure to a communication network for delivery to at least the second computer system and a third computer system; and
indicating that a threat is present if the first data structure matches the second data structure.

45. The method of claim 44, wherein the first computer system, the second computer system, and the third computer system are collaborating systems.

46. The method of claim 45, wherein the one-way data structures are exchanged through at least one proxy.

47. The method of claim 44, wherein detecting the third intrusion alert includes determining that a payload is anomalous.

48. The method of claim 44, wherein the second intrusion alert corresponds to one of a scan and probe.

49. The method of claim 44, wherein the second intrusion alert corresponds to a blocked worm.

50. The method of claim 44, wherein the first one-way data structure is a bloom filter.

51. The method of claim 44, wherein storing second data comprises forming a hash of the second data.

52. The method of claim 51, wherein forming the hash comprises using at least one of the SHA-1 and the MD-5 hashing algorithms.

53. The method of claim 44, wherein indicating that the threat is present comprises outputting an IP address of the source of the threat.

54. The method of claim 44, wherein indicating that the threat is present comprises causing a firewall to block traffic from an IP address of the source of the threat.

55. The method of claim 44, wherein indicating that the threat is present comprises outputting a signature associated with the threat.

56. A system for detecting a threat in a plurality of computer systems, comprising:
a first computer system that:
receives a first one-way data structure from a second computer system, the first one-way data structure representing first data relating to a first intrusion alert detected at the second computer system such that the first data is hidden in the first one-way data structure;
stores second data in a second one-way data structure wherein the second data is hidden in the second one-way data structure;
compares the first data structure and the second data structure;
detects a third intrusion alert;
identifies third data relating to the third intrusion attempt that is not to be revealed to another computer system;
selects a third one-way data structure based on at least one characteristic of the third data;
stores the third data in the third one-way data structure such that the third data is hidden in the third one-way data structure so as not to be revealed to the other computer system;
sends the third one-way data structure to a communication network for delivery to at least the second computer system and a third computer system; and
indicates that a threat is present if the first data structure matches the second data structure.

57. The system of claim 56, wherein the first computer system, the second computer system, and the third computer system are collaborating systems.

58. The system of claim 57, wherein the one-way data structures are exchanged through at least one proxy.

59. The system of claim 56, wherein detecting the third intrusion alert includes determining that a payload is anomalous.

60. The system of claim 56, wherein the second intrusion alert corresponds to one of a scan and probe.

61. The system of claim 56, wherein the second intrusion alert corresponds to a blocked worm.

62. The system of claim 56, wherein the first one-way data structure is a bloom filter.

63. The system of claim 56, wherein storing second data comprises forming a hash of the second data.

64. The system of claim 63, wherein forming the hash comprises using at least one of the SHA-1 and the MD-5 hashing algorithms.

65. The system of claim 56, wherein indicating that the threat is present comprises outputting an IP address of the source of the threat.

66. The system of claim 56, wherein indicating that the threat is present comprises causing a firewall to block traffic from an IP address of the source of the threat.

67. The system of claim 56, wherein indicating that the threat is present comprises outputting a signature associated with the threat.

* * * * *

UNITED STATES PATENT AND TRADEMARK OFFICE
CERTIFICATE OF CORRECTION

PATENT NO. : 8,381,295 B2  Page 1 of 1
APPLICATION NO. : 12/833743
DATED : February 19, 2013
INVENTOR(S) : Salvatore J. Stolfo et al.

It is certified that error appears in the above-identified patent and that said Letters Patent is hereby corrected as shown below:

In the Claims

Column 12, Claim 13, line 2, "the SHA-1and" should be --the SHA-1 and--.
Column 12, Claim 13, line 2, "the MD-5hash-" should be --the MD-5 hash- --.
Column 12, Claim 15, line 2, "the SHA-1and" should be --the SHA-1 and--.
Column 12, Claim 15, line 2, "the MD-5hash-" should be --the MD-5 hash- --.
Column 14, Claim 35, line 2, "the SHA-1and" should be --the SHA-1 and--.
Column 14, Claim 35, line 2, "the MD-5hash-" should be --the MD-5 hash- --.

Signed and Sealed this
Twenty-fifth Day of June, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,381,295 B2  
APPLICATION NO. : 12/833743  
DATED : February 19, 2013  
INVENTOR(S) : Salvatore J. Stolfo et al.

Page 1 of 1

It is certified that error appears in the above-identified patent and that said Letters Patent is hereby corrected as shown below:

In the Claims

Column 12, line 31 (Claim 13, line 2) "the SHA-1and" should be --the SHA-1 and--.
Column 12, line 31 (Claim 13, line 2) "the MD-5hash-" should be --the MD-5 hash- --.
Column 12, line 44 (Claim 15, line 2) "the SHA-1and" should be --the SHA-1 and--.
Column 12, line 44 (Claim 15, line 2) "the MD-5hash-" should be --the MD-5 hash- --.
Column 14, line 5 (Claim 35, line 2) "the SHA-1and" should be --the SHA-1 and--.
Column 14, line 5 (Claim 35, line 2) "the MD-5hash-" should be --the MD-5 hash- --.

This certificate supersedes the Certificate of Correction issued June 25, 2013.

Signed and Sealed this
Twenty-third Day of July, 2013

Teresa Stanek Rea
*Acting Director of the United States Patent and Trademark Office*